United States Patent

Chen et al.

[15] 3,687,988

[45] Aug. 29, 1972

[54] REACTION OF ACETIC ACID DERIVATIVES WITH ETHYLENE

[72] Inventors: Albert C. Chen, Highland Park; Stephen A. Butter, Boundbrook, both of N.J.; Richard W. Hobson, Albuquerque, N. Mex.

[73] Assignee: Mobil Oil Corporation

[22] Filed: Nov. 18, 1970

[21] Appl. No.: 90,788

[52] U.S. Cl. ............... 260/398, 260/410.9, 260/485, 260/404, 260/561
[51] Int. Cl. ......................... C07c 53/00, C07c 57/00
[58] Field of Search....260/398, 404, 410.9, 491, 561

Primary Examiner—Elbert L. Roberts
Attorney—Frederick E. Dumoulin, William J. Scherback, Oswald G. Hayes and Andrew L. Gaboriault

[57] ABSTRACT

This specification discloses a process of reacting an acetic acid derivative with ethylene in the presence of a catalyst. The acetic acid derivatives include esters, the amide, substituted amides, and the anhydride of acetic acid. The catalyst is insoluble in the acetic acid derivatives, the ethylene, and the reaction products thereof and is an oxide of manganese wherein the manganese has a valence at least as great as 3. The catalyst, following the reaction, can be separated from the reaction mixture and regenerated by heating in the presence of an oxygen-containing gas. Thereafter, the regenerated catalyst may be employed further for the reaction of an acetic acid derivative with ethylene.

11 Claims, No Drawings

3,687,988

REACTION OF ACETIC ACID DERIVATIVES WITH ETHYLENE

BACKGROUND OF THE INVENTION

1. Field of the Invention

This invention relates to the reaction of an acetic acid derivative with ethylene in the presence of an oxide of manganese as a catalyst.

2. Description of the Prior Art

Copending application, Ser. No. 72,228, filed Sept. 14, 1970, now U.S. Pat. No. 3,641,120 discloses the production of long chain fatty acids by reacting an ester of an acid having at least two carbon atoms and at least one hydrogen atom on the alpha carbon atom of the acid moiety of the ester with an olefin in the presence of a manganic carboxylic acid salt or oxide and a zirconyl carboxylic acid salt of zirconium oxide to form a long chain ester.

U.S. Pat. application, Ser. No. 755,732, filed Aug. 27, 1968, discloses the reaction of an ester with an olefin in the presence of manganic acetate as a catalyst to produce ester compounds.

SUMMARY OF THE INVENTION

In accordance with the invention, there is provided a process for reacting an acetic acid derivative with ethylene in the presence of a catalyst. The catalyst is insoluble in the acetic acid derivative, in ethylene, and in the reaction products thereof. This catalyst comprises an oxide of manganese wherein the manganese has a valence at least as great as 3. In accordance with a specific embodiment of the invention, the catalyst, following the reaction, is regenerated by heating in the presence of an oxygen-containing gas. In accordance with another specific embodiment of the invention, the regenerated catalyst is employed further for the reaction of an acetic acid derivative with ethylene.

DESCRIPTION OF THE PREFERRED EMBODIMENTS

In the process of the invention, the catalyst employed is insoluble in the reactants, namely, the acetic acid derivative and the ethylene, and is insoluble in the reaction products obtained. Stated otherwise, the catalyst employed is a heterogeneous catalyst and is in the solid phase during the course of the reaction whereas the reactants and reaction products are in the gaseous and liquid phases. As a consequence, the catalyst is readily removable from the reaction products at the termination of the reaction. The process of the invention, accordingly, provides an advantage over procedures heretofore employed wherein the catalyst is soluble in the reaction mixture. During the course of the reaction, the catalyst becomes reduced, as will be pointed out in greater detail below, and therefore enters a lower valent state. However, the catalyst, being an oxide of manganese even after entering the lower valent state, is readily regenerated by oxidation. This oxidation is simply effected by contacting the catalyst with an oxygen-containing gas at an elevated temperature.

In the practice of the invention, any acetic acid derivative may be employed. However, it is preferred that the esters, the amide, the substituted amides, and the anhydride of acetic acid by employed. Of the esters, it is preferred that the shorter chain esters of acetic acid be employed. Thus, it is preferred that the ester employed be the methyl, ethyl, butyl, or pentyl ester of the acetic acid.

The reaction of an acetic acid derivative with ethylene in the presence of the catalyst involves telomerization of the ethylene with the derivative. In the telomerization reaction, as a first step, the derivative reacts with the oxide of manganese to produce a free radical. This free radical is produced as a result of removing a hydrogen atom from the carbon atom of the acetyl moiety of the derivative. The hydrogen atom combines with the oxide of manganese to produce an oxide of manganese wherein the manganese has one lower valence, i.e., becomes reduced as mentioned above, and to produce water. The free radical then combines with the ethylene to form another free radical and the reaction continues with addition of ethylene to the free radical until stoppage of chain growth occurs.

By the telomerization reaction, a variety of reaction products can be obtained. Where the acetic acid derivative is an ester, the reaction products are a variety of corresponding esters having a longer hydrocarbon chain than the starting ester. Where the acetic acid derivative is an amide or substituted amide, the reaction products are a variety of amide or substituted amides corresponding to the starting amide or substituted amide but having a longer hydrocarbon chain. Where the acetic acid derivative is the anhydride, the reaction products are a variety of longer chain fatty acid anhydrides. By side reactions, where free radicals react with each other, rather than with ethylene, a variety of diesters, diamides, and substituted diamides is also produced. By chain breakage, where acetic acid anhydride is employed, a variety of mono-acids is also produced.

The reaction products obtained by the process of the invention may be further treated to convert them to other compounds, if desired. Thus, the ester products may be hydrolyzed to form the corresponding acids. The amide and substituted amide products may be transesterified to form esters. Acid products may also be esterified to form esters.

As the catalyst, any of the oxides of manganese wherein the manganese has a valence at least as great as 3 may be employed. As stated hereinabove, the oxide of manganese, during the course of the reaction, becomes reduced and enters into a lower valent state. Thus, strictly speaking, the oxide of manganese does not function as a catalyst but rather functions as a reactant. On the other hand, whereas the oxide of manganese acts as a reactant, it does not form part of the reaction products of the acetic acid derivative with the ethylene nor does it otherwise combine with the reactants or with other reaction products.

Manganese, as is known, can exist in the form of oxides wherein the valence is 2, 3, 4, 6, or 7. The oxide wherein the valence of the manganese is 2 is manganous oxide and represents the lowest valence of manganese in an oxide thereof. As mentioned, the reaction involves the formation of a free radical by removal of hydrogen from the acetic acid derivative and reaction of this hydrogen with the oxygen of the oxide of manganese to produce water. However, reduction of manganous oxide to manganese, i.e., the free metal state, cannot occur under the conditions of the reaction. However, reduction of the manganese from any of the other valent states to a lower valent state can occur under the conditions of the reaction. The oxides which may be employed include manganic oxide — $Mn_2O_3$, manganic manganous oxide — $Mn_3O_4$, manganese dioxide — $MnO_2$, and manganese heptoxide — $Mn_2O_7$. If desired, two or more oxides of manganese may be employed. Hydrous oxides may also be employed. Thus, $MnO \cdot OH$ and manganic hydroxide, $Mn(OH)_3$, may be employed. The oxides of manganese may also be employed in the form in which they are in chemical combination with another metal. Thus, potassium permanganate may be employed.

The oxides of manganese for use in the process of the invention may be obtained in any suitable manner. For example, oxides of manganese, or hydrous oxides of manganese, can be prepared from manganous chloride, sulfate, acetate, oxalate, or carbonate. The manganous chloride, sulfate, or acetate can be dissolved in water and hydrous manganous oxide precipitated by adding a base to the solution. In the presence of air, the hydrous manganous oxide formed reacts to form manganic hydroxide or a mixture of lower and higher valent hydrous oxides. Upon heating these compounds in air, various oxides of manganese are formed depending upon the temperature and length of heating. Further, manganous oxalate and carbonate can be heated in air to form various oxides of manganese depending upon the temperature and length of heating.

Consideration now will be given to the conduct of the reaction. The concentration of the ethylene may range from 0.01 to 3 moles, preferably 0.25 to 1 mole, per mole of oxide of manganese. The acetic acid derivative is employed ordinarily in an amount which is tenfold greater than the olefin. The temperature may be from 100° C. to just below the critical temperature of the reaction mixture. The ethylene is quite volatile, and, accordingly, the reaction is carried out in suitable pressure apparatus. Pressures employed may be between 200 and 3,000 pounds per square inch gage. Reaction times generally extend from an hour or less to five or ten hours or more. An inert atmosphere, such as one of nitrogen, carbon dioxide, helium and the like, is desirably maintained over the reaction mixture to lessen or avoid oxidation by air. The catalyst is employed in the amount of 1 to 50 percent by weight of the reaction mixture.

At the conclusion of the reaction, the reaction mixture may be filtered or otherwise treated to remove mechanically the catalyst. Thereafter, the reaction mixture may be treated by conventional distillation, extraction, fractional crystallization, or the like to separate the long chain ester product from other components of the reaction mixture.

The reaction may be carried out in any suitable manner. For example, the reaction may be carried out by adding the oxide of manganese to the remainder of the reaction mixture and maintaining the oxide and the remainder of the reaction mixture in contact with each other throughout the entire reaction time. The entire amount of the oxide of manganese may be added to the remainder of the reaction mixture prior to the beginning of the reaction or only a portion of the oxide of manganese added initially and the remainder added intermittently or continuously to the remainder of the reaction mixture as the reaction proceeds. Alternatively, the reaction may be carried out by passing the mixture of acetic acid derivative and ethylene through a bed of the oxide of manganese.

The catalyst recovered from the reaction mixture, as previously indicated, may be regenerated. Regeneration is readily effected by subjecting the catalyst to the action of an oxygen-containing gas at elevated temperatures. Suitably, the oxygen-containing gas may be air. On the other hand, pure or relatively pure oxygen may be employed as the regeneration medium. Temperatures of between 200° C. and 600° C. will effect satisfactory regeneration. In connection with the regeneration, it is not essential that the spent catalyst be oxidized to the same valent state it existed in prior to the reaction for the production of the fatty acid esters. Rather, oxidation can be effected to convert the manganese to any higher valent state. Further, where an oxide of manganese such as potassium permanganate is employed, regeneration with an oxygen-containing gas will not reform the potassium permanganate.

Following the regeneration reaction, the regenerated oxide of manganese may be employed as desired. However, suitably, the regenerated oxide of manganese can be employed further as a catalyst for reaction of an acetic acid derivative with ethylene. Thus, the oxide of manganese, following regeneration, may be recycled to the reaction vessel in which the reaction of the acetic acid derivative with ethylene was carried out. Thus, a continuous process may be employed wherein acetic acid derivative, ethylene, and catalyst are continuously passed to a reaction vessel, reaction mixture is removed from the vessel and reaction products and spent catalyst removed therefrom. The spent catalyst is recovered from the reaction mixture, regenerated, and recycled to the reaction vessel. Additionally, unreacted ethylene, and unreacted acetic acid derivative, may also be recycled to the reaction vessel.

The following examples will be illustrative of the invention.

EXAMPLE 1

Manganic oxide, $Mn_2O_3$, in the amount of 20 grams (g), along with 500 milliliters (ml) of methyl acetate, was placed in a 1-liter, stainless steel autoclave. The autoclave was heated to 190° C. and maintained at this temperature for a period of 4 hours. During this period, the contents of the autoclave were stirred and a pressure of ethylene of 500 pounds per square inch (psi) was maintained in the autoclave. At the end of the 4-hour period, the contents were removed from the autoclave and solid oxide of manganese was removed therefrom. Unreacted methyl acetate was removed and the remainder of the reaction mixture was subjected to distillation. The distillation procedure yielded 6.6 grams of product. Analysis of the product showed that it contained:

Methyl butyrate
Methyl caproate
Methyl caprylate
Methyl caprate
Methyl laurate
Methyl myristate
Methyl palmitate
Methyl stearate Methyl arachidate
Methyl behenate
Dimethyl succinate
Dimethyl adipate
Dimethyl suberate
Dimethyl sebacate

EXAMPLE 2

Methyl acetate (500 ml), $Mn_2O_3$ (16.5 g) and ethylene in a 1-liter stainless steel autoclave were stirred and heated at 200° C. for 5 hours. During the course of the reaction, the total pressure of the autoclave was maintained at 750 psi by recharging with additional ethylene.

Removal of solid salts and the solvent, and subsequent distillation, gave 8.4 g of products that contained methyl esters of $C_4$, $C_6$, $C_8$, $C_{10}$, $C_{12}$, $C_{14}$, $C_{16}$, $C_{18}$, $C_{20}$, and $C_{22}$ ($C_4$—$C_{22}$) fatty acids and dimethyl esters of $C_4$, $C_6$, $C_8$, $C_{10}$, and $C_{12}$ ($C_4$—$C_{12}$) dicarboxylic acids.

EXAMPLE 3

In an autoclave were placed 10.0 g of manganic hydroxide, $Mn(OH)_3$, and 500 ml of methyl acetate. After ethylene (200 psi) was pressured into the autoclave, the reactants were stirred and heated at 190° C. for 6 hours. The reaction yielded 3.2 g of products which contained methyl esters ($C_4$—$C_{22}$) and dimethyl esters of dicarboxylic acids ($C_4$—$C_{12}$).

EXAMPLE 4

Into a 1-liter stainless steel autoclave were charged 10.0 g of $Mn_2O_3$ and 500 ml of acetic anhydride and ethylene. The reactants were stirred and heated at 200° C. under a total pressure of 750 psi for 5 hours. After cooling, solids were removed by filtration. The filtrate yielded 11.0 g of products which were esterified with methanol and sulfuric acid. Analysis of the esterified products showed that they contained mixtures of methyl esters of $C_4$—$C_{22}$ fatty acids and dimethyl esters of $C_4$—$C_{12}$ dicarboxylic acids.

EXAMPLE 5

Into a 1-liter stainless steel autoclave were charged 21.7 g of manganese dioxide, $MnO_2$, and 500 ml of methyl acetate. The suspension was stirred and heated to 160° C. and ethylene was pressured in until a total pressure of 500 psi was reached. The reactants were heated at 190° C. for 4 hours. After removal of solids and solvents, distillation was carried out to give 7.8 g of products containing methyl esters of fatty acids ($C_4$—$C_{22}$) and dimethyl esters of dicarboxylic acids ($C_4$—$C_{12}$).

EXAMPLE 6

Into a 1-liter stainless steel autoclave were charged 20.0 g of $Mn_2O_3$, 500 ml of N,N-dimethylacetamide, and ethylene. The reactants were stirred and heated to 190° C. at which temperature the pressure was increased to 750 psi by pumping in more ethylene. Removal of solids and distillation of the filtrate left a high boiling residue which was transesterified with methanol and sulfuric acid. The esterified products contained methyl esters of fatty acids ($C_4$—$C_{22}$) and dimethyl esters of dicarboxylic acids ($C_4$—$C_{12}$).

EXAMPLE 7

Five procedures were carried out wherein ethyl acetate and ethylene were reacted together in the presence of manganic oxide, $Mn_2O_3$. Following the reactions, the manganese material was filtered from the remainder of each of the reaction mixtures. The filtered manganese-containing material from each procedure was analyzed by iodometric titrimetry for the amount of manganese(III). The material from each procedure was then regenerated by heating in the presence of air at various temperatures and for various periods of time. Following the heating procedure, each of the manganese-containing materials was again analyzed for the amount of manganese(III).

The following table gives the time and temperature of heating, the percentage of manganese(III) before regeneration and the percentage of manganese(III) after regeneration.

| % Mn(III) Before | % Mn(III) After | Temp. °C/ Time, hr. |
|---|---|---|
| 32.2 | 75.9 | 350/19 |
| 30.4 | 73.4 | 350/19 |
| 52.2 | 68.4 | 350/2.5 |
| 49.9 | 75.6 | 600/19 |
| 36.8 | 68.8 | 600/2.5 |

We claim:
1. A process comprising reacting an acetic acid derivative selected from the group consisting of an ester of acetic acid, acetamide, N,N-dimethylacetamide, and acetic anhydride with ethylene in the presence of a catalyst insoluble in said derivative, in ethylene, and in reaction products of said derivative and ethylene comprising an oxide of manganese wherein said manganese has a valence at least as great as 3.

2. The process of claim 1 wherein said acetic acid derivative is an ester of acetic acid.

3. The process of claim 2 wherein said ester of acetic acid is an ester selected from the group consisting of the methyl, ethyl, butyl, and pentyl esters.

4. The process of claim 1 wherein said acetic acid derivative is acetamide.

5. The process of claim 1 wherein said acetic acid derivative is N,N-dimethylacetamide.

6. The process of claim 1 wherein said acetic acid derivative is acetic anhydride.

7. The process of claim 1 wherein, following the reaction of said acetic acid derivative with said ethylene, said insoluble catalyst is removed from the resulting reaction mixture, and regenerated by heating in the presence of an oxygen-containing gas.

8. The process of claim 7 wherein said regenerated catalyst is employed further for the reaction of an acetic acid derivative selected from the group consisting of an ester of acetic acid, acetamide, N,N-dimethylacetamide, and acetic anhydride with ethylene.

9. The process of claim 1 wherein said oxide of manganese is manganic oxide.

10. The process of claim 1 wherein said oxide of manganese is manganic hydroxide.

11. The process of claim 1 wherein said oxide of manganese is manganese dioxide.

* * * * *